Fig.1.

LE BARON C. COLT.
LASTING MACHINE.
APPLICATION FILED AUG. 12, 1908.

1,108,551.

Patented Aug. 25, 1914.
6 SHEETS—SHEET 4.

WITNESSES.
C. G. Bradley.
J. H. Thurston

INVENTOR.
Le Baron C. Colt,
By Wilmarth H. Thurston,
ATTORNEY.

LE BARON C. COLT.
LASTING MACHINE.
APPLICATION FILED AUG. 12, 1908.

1,108,551.

Patented Aug. 25, 1914.
6 SHEETS—SHEET 5.

FIG. 5.

WITNESSES.
C. G. Bradley.
J. H. Thurston

INVENTOR.
Le Baron C. Colt,
By Wilmarth H. Thurston,
ATTORNEY.

LE BARON C. COLT.
LASTING MACHINE.
APPLICATION FILED AUG. 12, 1908.

1,108,551.

Patented Aug. 25, 1914.
6 SHEETS—SHEET 6.

WITNESSES.
C. G. Bradley.
J. H. Thurston

INVENTOR.
Le Baron C. Colt,
By Wilmarth H. Thurston,
ATTORNEY.

UNITED STATES PATENT OFFICE.

LE BARON C. COLT, OF BRISTOL, RHODE ISLAND.

LASTING-MACHINE.

1,108,551.  Specification of Letters Patent.  Patented Aug. 25, 1914.

Application filed August 12, 1908. Serial No. 448,164.

*To all whom it may concern:*

Be it known that I, LE BARON C. COLT, of Bristol, in the county of Bristol and State of Rhode Island, have invented certain new and useful Improvements in Lasting-Machines; and I do hereby declare the following specification, taken in connection with the accompanying drawings, forming a part of the same, to be a full, clear, and exact description thereof.

The machine shown and described is especially designed and adapted for lasting rubber-shoes or shoes made of rubber and fabric, but may also, if desired, be employed for the lasting of leather shoes.

The object of the invention is to produce a machine by means of which the lasting of the shoe will be automatically performed, and which in the case of rubber-shoes or shoes of rubber and fabric will operate not only to fold the upper upon the last but to automatically secure or attach the upper to the in-sole.

One feature of the invention consists in providing means whereby the last with the upper applied thereto is caused to travel automatically past a series of spring-actuated rolls arranged to bear upon the upper and operating to fold the upper over the edge and down upon the bottom of the last.

So far as the main feature of the invention is concerned, the spring-actuated rolls referred to might all be arranged in substantially the same plane, and so as to operate upon the shoe at the same time. In order, however, to facilitate the arrangement of the coöperating parts it is desirable to arrange said rolls in two or more planes, and a further feature of the invention therefore consists in providing a series of spring-actuated rolls adapted to operate upon the shoe and located in different planes, and whereby the shoe may be first carried by one set of rolls and be operated upon thereby and may then be carried by the next set of rolls and operated upon thereby.

For the purpose of traveling the shoe past the spring-actuated rolls referred to the last having the upper and in-sole applied thereto is mounted on a movable support, and it is desirable that the last with said upper and in-sole applied thereto shall be clamped and held in position upon said movable support. It is necessary, however, that the clamping member shall be separated from the movable support at certain times for the purpose of removing the lasted shoe and applying another last to said movable support, and a further feature of the invention consists in the combination with a movable support of a movable clamping member, and providing means whereby both said movable support and movable clamping member will at times be moved in unison and at other times will be moved one with relation to the other.

The invention further consists in certain combinations and arrangements of parts to be hereinafter described.

Referring to the drawings.

Figure 2:
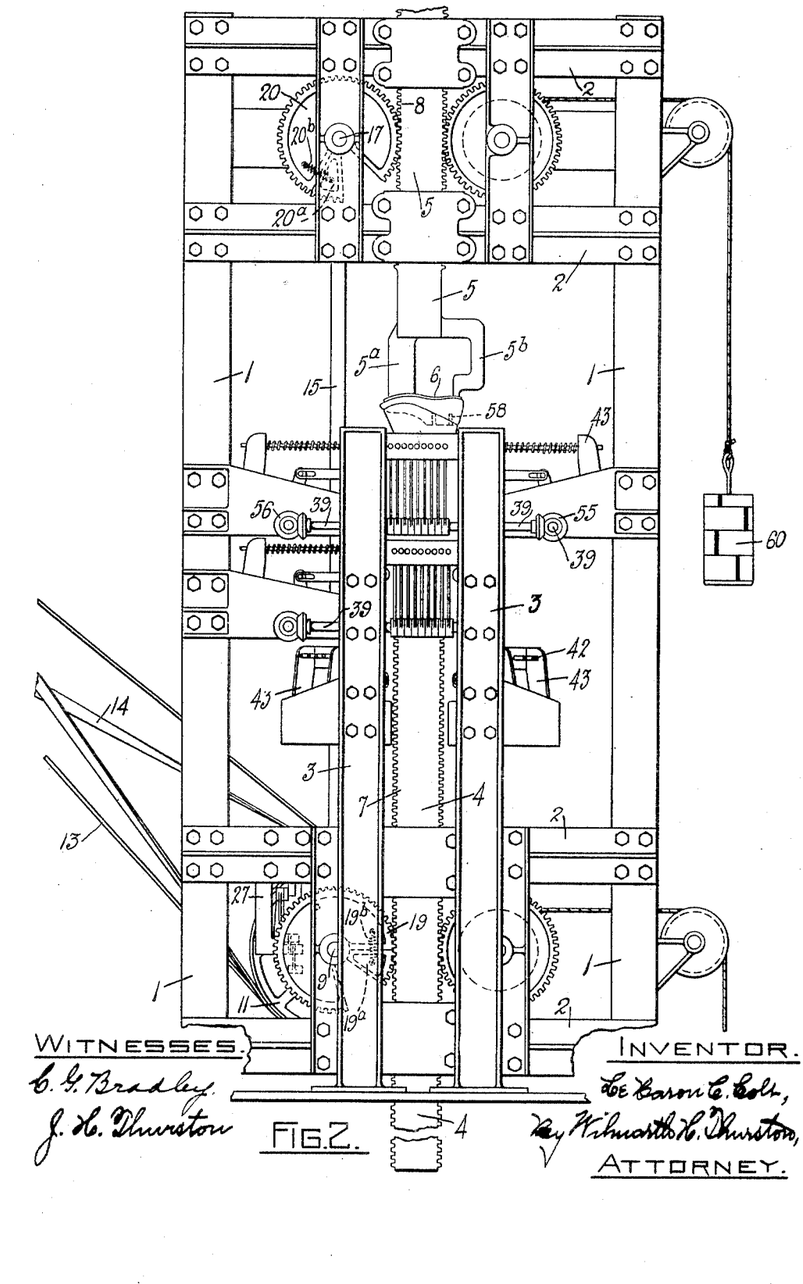
Fig. 2 is a front elevation.
Figure 3:
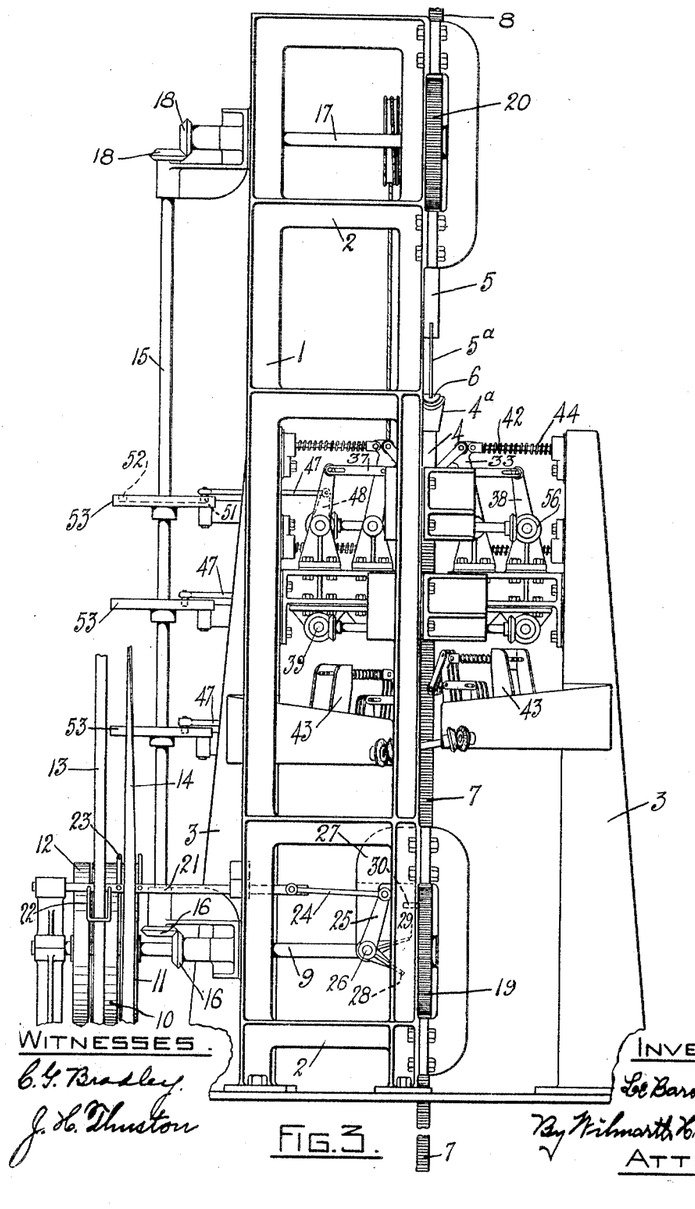
Fig. 3 is a side elevation looking from the left in Fig. 1.

The frame of the machine comprises four uprights, 1, 1, 1, 1, suitably connected by cross-ties 2 which may either be formed integral with the uprights, as in Fig. 3, or bolted thereto, as in Fig. 2. There are also four uprights, 3, 3, 3, 3, which extend about two-thirds of the way to the top of the machine.

4 is the movable support on which the last with the upper thereon is mounted. It is preferred to provide the movable support 4 with an enlargement $4^a$ at its upper end, which enlargement is provided with a recess, and thus constitutes a receptacle to receive the last with the upper thereon, as indicated by dotted lines in Fig. 4. The enlargement $4^a$ is formed at the left hand or toe end with a bevel or incline $4^b$ for a purpose to be hereafter described.

5 is the movable clamping member adapted to coöperate with the movable support 4, as hereinafter described. The clamping member 5 is provided at its lower end with two extensions $5^a$ and $5^b$, to the lower ends of which is secured a clamping plate 6.

This clamping plate is preferably about the size and shape of the in-sole which is applied to the last.

The movable support 4 is provided with a rack 7, and the movable clamping member 5 is provided with a rack 8.

9 is the driving shaft which as shown is provided with a fast pulley 10, and two loose pulleys 11 and 12. Two belts, an open belt 13 and a cross-belt 14, operated from a suitable countershaft, are provided for rotating the shaft 9 first in one direction and then in the other. The vertical shaft 15 is connected with the shaft 9 by a pair of bevel gears 16, and said shaft 15 is connected to a horizontal shaft 17 by a pair of bevel-gears 18. Secured to the shaft 9 is a gear 19 arranged to engage the rack 7 on the movable member 4, and secured to the shaft 17 is a gear 20 arranged to engage the rack 8 on the movable member 5.

The gears 19 and 20 are of peculiar construction. As shown in Fig. 2, a segment is cut out of each of said gears. Referring first to the gear 19, a gear-segment 19ª, the arc of which is about one-half the arc of the segment which is cut out of said gear 19, is loosely mounted on the shaft 9. A similar gear-segment 20ª is loosely mounted on the shaft 17. Preferably the loose segment-gear 19ª is connected to the gear 19 by a spring 19ᵇ and the loose segment-gear 20ª is likewise connected to the gear 20 by a similar spring 20ᵇ. The purpose of this construction will be hereinafter described.

For the purpose of reversing the direction of rotation of the gears 19 and 20 and correspondingly reversing the movements of the movable support 4 and the movable clamping member 5 the following means are provided: The position of the belts 13 and 14 is controlled by a shipper-bar 21 provided with suitable forks 22 and 23 engaging the belts 13 and 14 respectively. The shipper-bar 21 is connected by a link 24 with an arm 25 secured to a short shaft 26 mounted in suitable bearings in a hanger 27. Projecting from the shaft 25 are two radial arms 28 and 29 which lie in the path of, and each of which is adapted to be engaged by, a pin 30 projecting from the gear 19, as shown in Fig. 3.

Figures 4, 10:
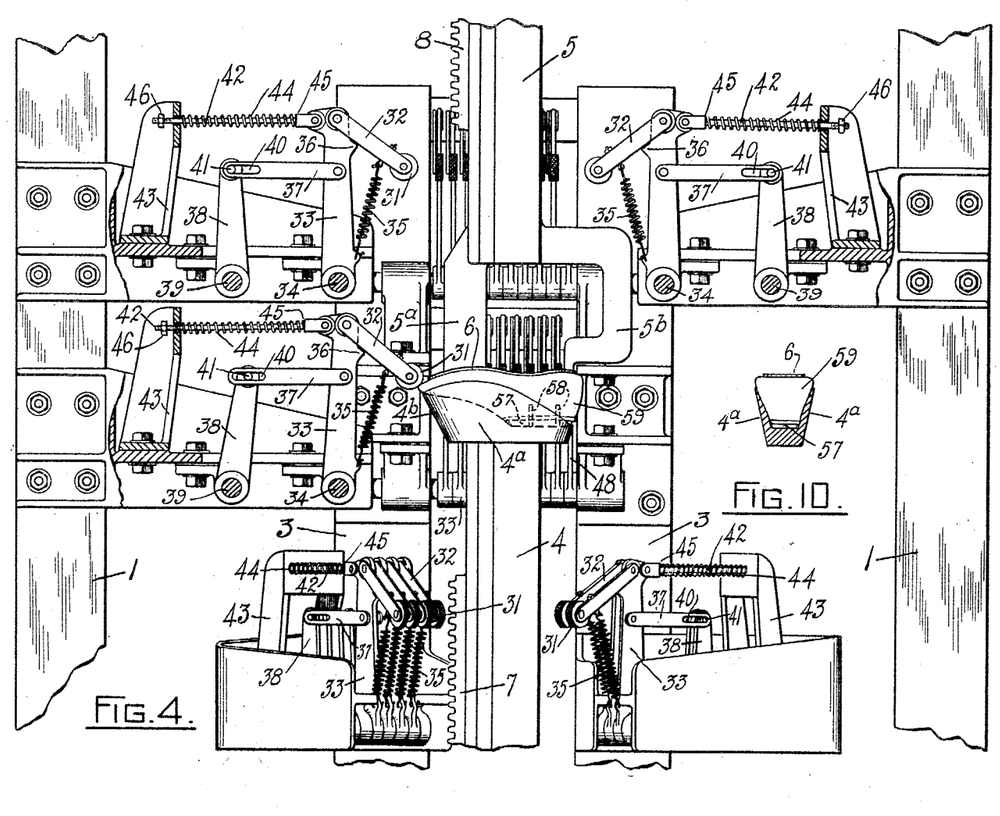
Fig. 4 is a section of a portion of the machine on a larger scale, said section being on the line $x$—$x$ of Fig. 1, but with the parts occupying a different position.
Fig. 10 is a sectional detail.
Figure 5:
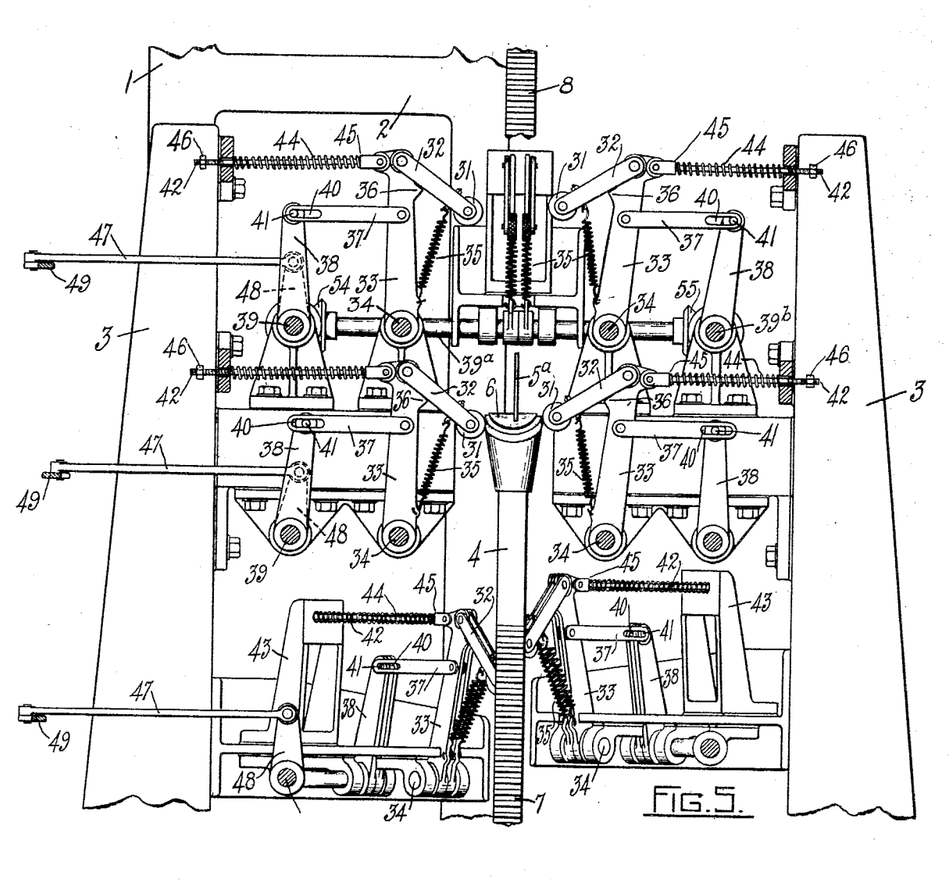
Fig. 5 is a corresponding section on the line $y$—$y$ of Fig. 1.
Figure 6:
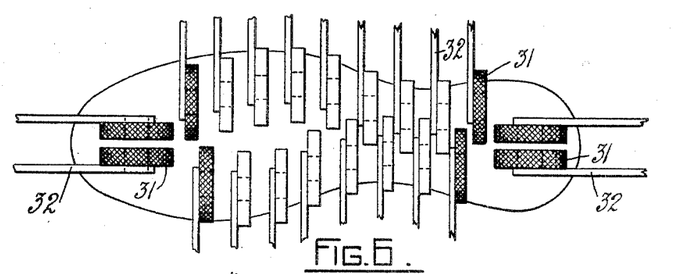
Figs. 6, 7, 8, and 9 are diagrammatic views showing the bottom or sole of the lasted shoe and showing respectively the positions of each set of operating rolls after they have completed their operation upon the shoe.
Figure 7:
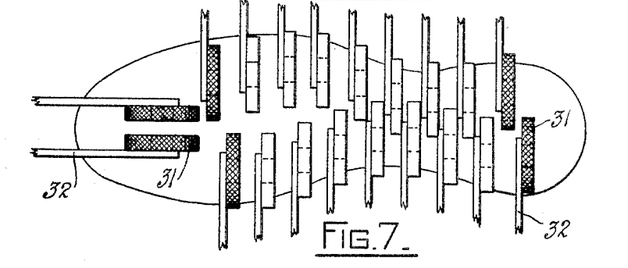

The construction and arrangement of the rolls which operate upon the shoe will next be described. In the machine shown in the drawings these rolls, as above stated, are arranged in different planes, and duplicate sets of mechanism are employed for operating the several series of rolls. As shown in Figs. 4 and 5, there are three sets of these rolls, and it may be here stated that of the three sets of rolls so shown the first or upper set of rolls is designed and adapted to operate mainly upon the sides of the shoe, there being, however, in this set two rolls arranged to operate upon the toe and two other rolls adapted to operate upon the heel, as shown in Fig. 6. The second or next set of rolls below are likewise adapted to operate mainly upon the sides of the shoe, but there are also in this set two rolls adapted to operate upon the toe, as shown in Fig. 7.

Figure 8:
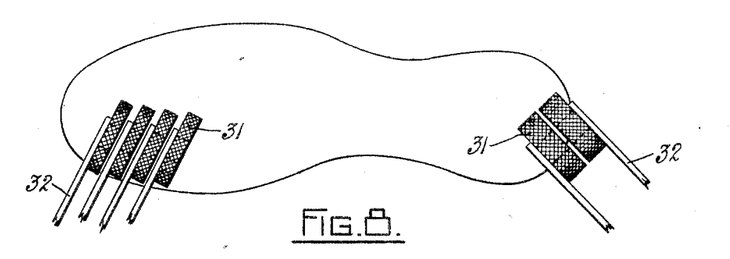
Figure 9:
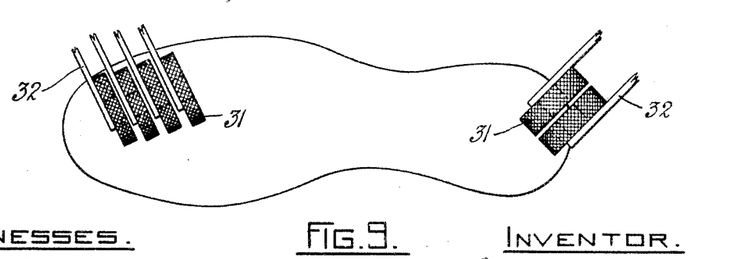

In the case of the third or lowest set of rolls, and which are arranged and adapted to operate only on the heel and toe, it has been found desirable to cause the rolls located at one side of the center line of the shoe to operate in advance of the rolls which are located on the opposite side of said center line, and for this purpose a portion of these rolls, four at the toe and two at the heel, are arranged to operate upon the shoe somewhat in advance of the other rolls of this set, the rolls thus first operating being shown in Fig. 8, while the remaining rolls located upon the other side of the center line of the shoe, viz., four rolls at the toe and two rolls at the heel, and being the rolls shown in Fig. 9, are arranged to operate somewhat later, all as clearly shown in Fig. 5.

As above stated, the mechanism for operating the several sets of rolls is duplicated in each case, and a detail description of the mechanism in connection with one set of rolls, therefore, is all that will be necessary. For convenience it may be considered that the following description relates to the first or upper set of rolls shown in the drawings.

Referring to Fig. 4, the rolls 31 are the rolls which operate upon the shoe. As the manner of mounting and the means for operating each of these rolls 31 is the same, a description of such mechanism in the case of one roll is all that will be required. The roll 31 is loosely mounted in the free end of an arm 32 which is pivoted to the upper end of an arm 33 loosely mounted on a shaft 34 supported in suitable bearings. A spring 35 is connected at one end to the arm 32 and at the other end to the arm 33, the action of said spring tending to pull the arm 32 toward the arm 33. Said arm 33 is provided with a stop 36 which serves to limit the movement of the arm 33 under the pull of the spring 35. The arm 33 is connected by a link 37 with another arm 38 secured to a shaft 39 mounted in suitable bearings. For a purpose to be hereafter described it is desirable that there should be lost motion between the arms 33 and 38, and accordingly the link 37 is provided with a slot 40 into which extends a pin 41 projecting from the upper end of the lever 38. To the upper end of the arm 33 is pivoted a rod 42 which extends through a hole formed in an upright bracket 43 secured to the frame. Surrounding the rod 42 is a spring 44, which spring abuts at one end against a shoulder 45 formed on the rod 42 and at the other end against the bracket 43, said spring 44 being normally under compression.

The rod 42 is provided with an adjustable nut 46 for limiting the movement of said rod and the parts connected therewith. As will be more fully explained hereafter, the spring 44 operates to force the roll 31 into contact with the shoe before the shoe has passed by the plane of said roll, and the spring 35 will then serve to pull the said roll down into contact with the bottom of the shoe.

Figure 1:
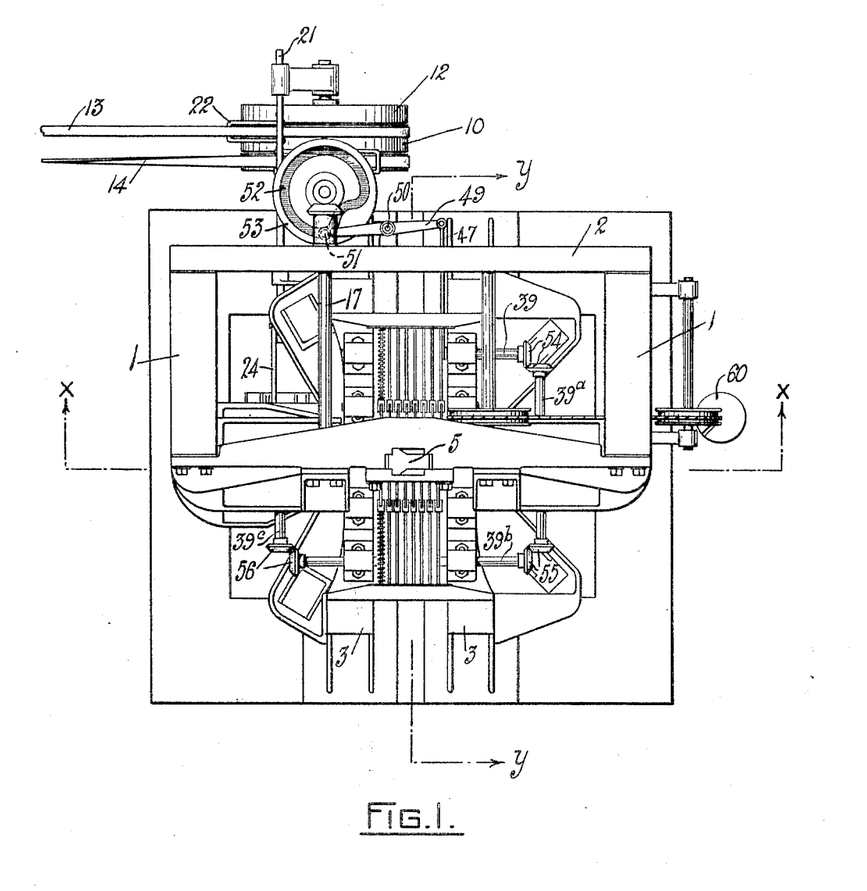
Figure 1 is a plan view of the machine.

It is desirable that the roll 31 after it has acted upon the shoe should be withdrawn and its position controlled until such time as it is to again act. For this purpose a suitable cam is provided for withdrawing said roll from its operating position and holding said roll withdrawn. Referring to Figs. 1, 3, and 5, a connecting rod 47 is connected at one end to an arm 48 (shown in dotted lines in Fig. 3) secured to the shaft 39, and is connected at its other end to one end of a lever 49 pivoted on the frame at 50. The other end of the lever 49 carries a roller 51 adapted to run in a cam-groove 52 formed in a cam 53 secured to the shaft 15.

As shown in Fig. 1, the shaft 39 is located at the back of the machine, and has secured to it all of the arms 38 which control the rolls 31 that operate on that side of the shoe. As shown in the drawings, all of the rolls of that one set are controlled by one and the same cam 53. For this purpose the shaft 39 is connected by a pair of bevel-gears 54 with a shaft 39ª to which are secured the arms 38 that control the rolls that operate on the heel of the shoe. Said shaft 39ª is in turn connected by a pair of bevel-gears 55 with a shaft 39ᵇ to which are secured the arms 38 which control the rolls that operate on the side of the shoe which is at the front of the machine. Said shaft 39ᵇ is in turn connected by a pair of bevel-gears 56 with a shaft 39ᶜ to which are secured the arms 38 that control the rolls that operate upon the toe of the shoe. With this construction, as will be seen, one single cam 53 will control all of the rolls in that set.

As shown in Fig. 3, there is a corresponding cam 53 for each of the three sets of rolls, with a similar connection between each of said cams and the corresponding shaft 39, and with suitable gear connections and shafts in each case for controlling all of the rolls in each set from a single cam.

57 represents a last which is shown in dotted lines in Fig. 4 as placed in position in the enlargement 4ª of the movable support 4 with the pins 58 which project upward from said enlargement extending into the usual holes in said last. It is to be understood that the upper 59 is to be applied to the last before the last is placed in position in the receptacle 4ª.

In describing the operation of the machine it will be convenient to first describe the movements of the movable support and the movable clamping member, and to then describe the operation of the several sets of rolls and their action in lasting the upper.

Assuming that a last with an upper and in-sole applied thereto has been placed in the receptacle at the upper end of the movable support 4, and that the clamping member 5 has been moved downward to bring the clamping plate 6 into engagement with the in-sole, and so as to clamp and hold the parts in position, and assuming that the shaft 9 and the shafts connected therewith are being rotated by the open belt 13, the gears 19 and 20 will be rotated in the direction to move downward in unison both the movable support and the movable clamping member for a distance sufficient to carry the shoe past the three sets of rolls. With the construction shown the arrangement is such that after the two members,—the movable support and the movable clamping member,— have thus moved downward together, the downward movement of the clamping member is arrested, while the downward movement of the movable support is continued for a time, thereby separating the two members so that the lasted shoe may be removed from said movable support. The arrangement shown is also such that the movable support, after moving downward the required distance, is reversed and caused to move upward for a time, the movable clamping member still remaining stationary, and then the two members are caused to travel upward together to a point where the upper end of the movable support is brought above the upper set of rolls, and then the upward movement of said movable support is arrested, while the clamping member continues to travel upward for a time, thereby again separating the parts, and so that another last may then be placed in position in the receptacle at the upper end of the movable support. While this is being done, the movement of the clamping member is reversed, and the clamping member is caused to travel downward and back to the position shown in Fig. 2 to clamp the parts in position.

The movements of the two members referred to as above described are effected by the mechanism shown in the following manner: Referring to Fig. 2, it will be seen that the loose segment-gear 19ª is held by its spring 19ᵇ against the right hand wall of the cut-out segment of the gear 19, while the loose segment-gear 20ª is held by its spring 20ᵇ against the left hand wall of the cut-out segment of the gear 20. It will be further seen that the rack 7 of the movable support is in engagement partly with the gear 19 and partly with the loose segment-gear 19ª, while the rack on the clamping member is in engagement only with the gear 20. It being understood that with the parts in the position shown in Fig. 2 the gears 19 and 20 are both rotated in a direction to move both the movable support and the clamping member downward, it will be seen that when these two members have been moved downward sufficiently far to carry the shoe past the three sets of rolls, the gear 20 will be turned around to a point where the loose segment-gear 20$^a$ will be brought into position to be engaged by the rack 8, while the rack 7 will still be engaged by the gear 19. The result will be that while the movable support will continue to be moved downward by the gear 19, the clamping member will remain stationary, the continued rotation of the gear 20 without an accompanying movement of said clamping member being permitted by the engagement of the loose segment-gear 20$^a$ with the rack 8. When the rack 8 thus engages said loose segment-gear, there would be nothing to support or hold said clamping member in its upper position unless some other means were provided, and for this purpose a counterweight 60 is connected with said clamping member, as shown in Fig. 2. The connection between said counterweight and said clamping member comprises a cord, to one end of which the counterweight is connected and the other end of which cord is connected to and wound upon a drum secured to a gear which meshes with rack-teeth formed on the clamping member 5 on the edge opposite from the rack-teeth 8. When the downward movement of the clamping member is thus arrested, the movable support continues to move downward for a time, being thus moved downward by the continued engagement of the gear 19 with the rack 7, and then before the loose segment-gear 19$^a$ reaches said rack, the pin 30 on the gear 19 is brought into engagement with the radial arm 28 which will serve to actuate the belt-shipper 21 to the left in Fig. 3, and so as to shift the open belt 13 from the tight pulley 10 to the loose pulley 12 and to shift the cross-belt 14 from the loose pulley 11 to the tight pulley 10, which will serve to reverse the direction of rotation of both of the gears 19 and 20. The reversal of the gear 19 will immediately serve to move the movable support upward, but the clamping member will not immediately begin to move upward, but instead the first effect of the reversal of the gear 20 will be merely to move back the loose segment-gear 20$^a$ to its starting point, and said movable member will not start upward until the gear 20 is brought into engagement with the rack 8. When this happens the movable support and the clamping member will travel upward together to the position in which these parts are shown in Fig. 2. When this point has been reached the upward movement of the movable support will in turn be arrested by reason of the engagement of the loose segment-gear 19$^a$ with the rack 7, while the upward movement of the clamping member which remains in engagement with the gear 20 will be continued, thereby again separating the two members, and so that another last with the upper applied thereto may be conveniently placed in position in the receptacle at the upper end of the movable support. It will be understood that when the upward movement of the movable support is thus arrested by the engagement of its rack with the loose segment-gear 19$^a$, said movable support will be prevented from falling by reason of a suitable counterweight connected therewith. At the proper time in the upward movement of said clamping member the pin 30 on the gear 19 will be brought into engagement with the other radial member 29, which will have the effect to move the belt-shipper 21 in the opposite direction, and so as to move the cross-belt 14 from the tight pulley 10 to the loose pulley 11 and to move the open belt 13 from the loose pulley 12 on to the tight pulley 10, which will again reverse the direction of rotation of both gears 19 and 20. When said gears have been thus reversed the clamping member will be moved downward, but the movable support will, by reason of the continued engagement of the rack 7 with the loose segment-gear 19$^a$, remain stationary until the clamping plate 6 has been brought into engagement with the in-sole of the last, at which time the gear 19 will again engage the rack 7 and thereupon both the movable support and the clamping member will move downward in unison as before.

The operation of the rolls and their action upon the upper will next be described. As the movable support and the clamping member with the shoe clamped between them are moved downward, the inclined walls of the enlargement 4$^a$ and the heel of the shoe will be brought into engagement with the rolls 31, and by reason of the inclination of the parts referred to said rolls will be forced backward somewhat against the action of the springs 44, thereby increasing the tension of said springs and causing said rolls to forcibly roll along the exposed portions of the upper and roll the same into firm and smooth contact with the last under the action of said springs until the rolls pass the edge of the last, when the springs 35 will come into action, and said rolls will then, under the action of the two springs 35 and 44, force the turned over edges of the upper into close contact with the inner sole, and where the upper is of rubber or rubbered fabric, will cause the same to become closely adhered to said in-sole. It will be seen that the rolls in acting upon the upper are always under spring-pressure, being during the first part of their movement under the action of the springs 44, and then when they have passed over the edge of the last under the action of both the springs 44 and the springs 35, and that thus said rolls as the shoe is passed by them operate with a dragging or drawing action, and serve to draw the upper around the edge of the last and to iron out, as it were, the material of the upper, at the same time forcing it into adhesive contact with the inner sole.

It will be understood that the operation of each of the three sets of rolls is the same, and it will be further understood that the reason for the three separate sets of rolls is to enable a sufficient number of rolls with their operating devices to be employed to practically act upon the entire area of the upper throughout the contour of the shoe, as indicated by the diagrammatic views Figs. 6, 7, 8, and 9. When the shoe has passed by the first set of rolls, for example, the cam 53 operates through the connecting mechanism to draw the rolls outward and away from the path traversed by the shoe as it passes through the machine. It is preferred to make the cam-groove 52 in said cam 53 of such shape, as shown in Fig 1, that the rolls will be withdrawn and held in their outer position during the greater part of the revolution of said cam, and will be permitted to move inward into a position to engage the shoe only just before the time arrives for the shoe to pass by the rolls.

In Figs. 4 and 5 the shoe is shown in the position where it is passing by and is being acted upon by the second set of rolls, and it will be seen that the rolls in the first set have been, by the action of the cam 53, withdrawn from their operating position.

It is desirable that the rolls in acting on the shoe shall always be spring-actuated and shall be free from any control of the cam 53. It is for this purpose that the lost motion described between the arm 33 and the arm 38 is provided. As will be seen by referring to Fig. 4, in which the second set of rolls is shown as operating upon the shoe, it will be seen that the pin 41 occupies a position about midway of the length of the slot 40, and so that the rolls 31 are thus entirely free of any action on the part of the cam 53, and thus are acted upon solely by their operating springs.

While it is preferred to remove the lasted upper when the movable support is at its lower position and to put in another last and upper when said movable support has moved to its upper position, and thus to provide means for effecting two separations between the movable support and the clamping member, such arrangement and operation is not essential, but instead if desired the lasted upper may be removed and another last and upper placed in position on the movable support while said movable support is in its lower position, or both of these things may be done when said movable support is in its upper position, in either of which cases only one separation of the movable support and the clamping member will be necessary. In case there is to be only one such separation of these members, it will only be necessary that one of the two gears 19 and 20 shall be provided with a loose segment-gear, and in such case the other gear may be a solid gear. If the separation of the movable support and clamping member is to take place when these parts are at their lower position, then the gear 20 should be a loose segment-gear, while the gear 19 may be a solid gear, whereas if the separation of said members is to take place when they are at their upper position, then the gear 19 should be a loose segment-gear, while the gear 20 may be a solid gear.

It will be understood that one purpose in providing the enlargement 4$^a$ at the upper end of the movable support is to provide means for effecting the proper movement of the rolls 31. Thus if such enlargement were not provided and the rolls 31 were permitted to come in contact with the underside of the last itself or the upper thereon, a proper movement might not be imparted to said rolls. With the enlargement 4$^a$ an inclined surface 4$^b$ is provided which serves to facilitate the proper movement of the rolls.

While it is preferred to provide a sufficient number of rolls to act upon practically the entire surface of the upper as it is folded over the last, and as shown in Figs. 6, 7, 8, and 9, it will be understood that this is not necessary in all cases, and that in some cases a lesser number of rolls may be employed, and it will be further understood that with a lesser number of rolls it may be possible to arrange said rolls in two sets instead of three, and in fact so far as the broad feature of the invention is concerned, a single set of rolls embodies all of the principles of the invention, and that where additional sets of rolls are employed one set is merely a duplicate of the other. It will be further understood that the mechanism for operating or controlling the rolls, as well as the mechanism for moving the last or the support therefor past the rolls, may be varied without departing from the invention.

What I claim as my invention and desire to secure by Letters Patent is:

1. In a lasting machine, the combination of a series of automatically actuated rolls, a support for the last, means for clamping the last upon said support, and means for automatically moving said support and said clamping means past said rolls first in one direction and then in the other.

2. In a lasting machine, the combination of a series of spring-actuated rolls, a support for the last, a clamping member for clamping the last upon said support, means for moving said last and said clamping member past said rolls, and means for automatically separating said last and said clamping member.

3. In a lasting machine, the combination of a series of spring actuated rolls, a support for the last, a clamping member for clamping the last upon said support, means for moving said support and said clamping member past said rolls, and means for automatically moving said clamping member toward and from said support.

4. In a lasting machine, the combination of a series of spring actuated rolls, a support for the last, a clamping member for clamping the last upon said support, means for moving said support and said clamping member past said rolls, and means for automatically moving said support toward and from said clamping member.

5. The combination of a support, a clamping member, means for moving said support and said clamping member in the same direction, and means for automatically separating said support and said clamping member.

6. The combination of a support, a clamping member, means for moving said support and said clamping member in the same direction, and means for automatically moving one of said parts with relation to the other.

7. The combination of a support, a clamping member, means for moving said support and said clamping member in the same direction, and means for automatically moving each of said parts with relation to the other.

8. The combination of a support, a clamping member, means for moving said support and said clamping member in unison, and means for automatically moving first one of said parts and then the other independently.

9. The combination of a support, a clamping member, means for moving said clamping member into clamping relation with said support, means for moving said support and said clamping member in unison, and means for moving said support away from said clamping member.

10. The combination of a support, a clamping member, means for moving said clamping member into clamping relation with said support, means for moving said support and said clamping member in unison, and means for moving said support away from and back toward said clamping member.

11. The combination of a support, a clamping member, means for moving said clamping member into clamping relation with said support, means for moving said support and said clamping member in unison, means for moving said support away from and back toward said clamping member, and means for moving said support and said clamping member in unison in the opposite direction.

12. The combination of a support, a clamping member, means for moving said clamping member into clamping relation with said support, means for moving said support and said clamping member in unison, means for moving said support away from and back toward said clamping member, means for moving said support and said clamping member in unison in the opposite direction, and means for moving said clamping member away from said support.

13. A lasting machine having in combination a work support, a rack for moving said work support and a loose segment gear for operating said rack.

14. The combination of a work-support, a clamping member, a rack for moving said clamping member, and a loose segment-gear for operating said rack.

15. A lasting machine having in combination a work support, a rack for moving said work support, a loose segment gear for operating said rack and means for rotating said loose segment gear first in one direction and then in the other.

16. A lasting machine having in combination a work support, a rack for moving said work support, a loose segment gear for operating said rack, means for rotating said loose segment gear and means controlled by said gear for reversing the direction of rotation thereof.

17. The combination of a work-support, a rack for moving said support, a clamping member, a rack for moving said clamping member, loose segment-gears, one for operating each of said racks, and means for rotating said loose segment-gears in unison.

18. The combination of a work-support, a rack for moving said support, a clamping member, a rack for moving said clamping member, loose segment-gears, one for operating each of said racks, and means for rotating said loose segment-gears first in one direction and then in the other.

19. In a lasting machine, the combination of two or more sets of automatically actuated rolls, each of said sets of rolls being arranged in a different plane and adapted to operate upon opposite sides of the upper.

20. In a lasting machine, the combination of two or more sets of automatically actuated rolls, each of said sets of rolls being arranged in a different plane, and means for moving the last first past one set of rolls and them past the other set.

21. In a lasting machine, the combination of a series of automatically actuated rolls, a portion of said rolls being adapted to operate upon the upper at one side of the center line of the shoe, and another portion of said rolls being adapted to operate at the other side of said center line, and one portion of said rolls being arranged to operate somewhat in advance of the other portion.

22. In a lasting machine, the combination of a series of automatically actuated rolls adapted to operate upon the upper, and means for withdrawing said rolls from operative position.

23. In a lasting machine, the combination of a series of automatically actuated rolls, a support for the last, means for moving said support past said rolls, and means for withdrawing said rolls out of the path of movement of said support.

24. In a lasting machine, the combination of a spring actuated roll, a support for the last, means for moving said support past said roll, and a cam for withdrawing said roll out of the path of movement of said support.

25. In a lasting machine, the combination of a spring-actuated roll, a support for the last, means for moving said support past said roll, a cam and connecting mechanism for withdrawing said roll out of the path of movement of said support, said connecting mechanism being provided with lost motion.

26. In a lasting machine, the combination of a series of spring-actuated rolls, a support for the last, means for moving said support past said rolls, and a cam and connecting mechanism for withdrawing all of said rolls out of the path of movement of said support.

27. In a lasting machine, the combination of a spring-actuated roll, a support for the last, and means for moving said support past said roll, said support being provided with a cam-surface for engaging said roll.

28. In a lasting machine, the combination of a series of spring-actuated rolls, a support for the last, a clamping member, a rack for moving said clamping member, a loose segment-gear for operating said rack, and a counterweight connected with said clamping member.

LE BARON C. COLT.

Witnesses:
W. H. THURSTON,
J. H. THURSTON.

Copies of this patent may be obtained for five cents each, by addressing the "Commissioner of Patents, Washington, D. C."